US008004612B2

(12) United States Patent
Kanauchu et al.

(10) Patent No.: US 8,004,612 B2
(45) Date of Patent: Aug. 23, 2011

(54) APPARATUS AND METHOD FOR CONTROLLING DISPLAY BRIGHTNESS IN AN IMAGE DISPLAY DEVICE

(75) Inventors: Katsuhiro Kanauchu, Yonezawa (JP); Shuichi Seki, Yonezawa (JP)

(73) Assignee: Tohoku Pioneer Corporation, Yamagata (JP)

( * ) Notice: Subject to any disclaimer, the term of this patent is extended or adjusted under 35 U.S.C. 154(b) by 1281 days.

(21) Appl. No.: 11/602,239

(22) Filed: Nov. 21, 2006

(65) Prior Publication Data

US 2007/0115215 A1 May 24, 2007

(30) Foreign Application Priority Data

Nov. 24, 2005 (JP) ................................ 2005-338725

(51) Int. Cl.
*H04N 5/57* (2006.01)
*H04N 3/12* (2006.01)
*G01F 13/00* (2006.01)

(52) U.S. Cl. .......................... 348/687; 348/797; 345/63

(58) Field of Classification Search .................. 348/254, 348/255, 257, 687, 797; 345/690, 589, 77, 345/63; 382/274; 358/461

See application file for complete search history.

(56) References Cited

U.S. PATENT DOCUMENTS 5,949,494 A * 9/1999 Yamagata et al. ............ 348/558
2004/0233229 A1 * 11/2004 Kimura ......................... 345/690
2005/0093886 A1 * 5/2005 Kubota ......................... 345/619
2005/0206588 A1 * 9/2005 Min et al. ........................ 345/63
2007/0047034 A1 * 3/2007 Ogata et al. .................. 358/521

FOREIGN PATENT DOCUMENTS

JP 9-281927 A 10/1997
JP 2001-175220 A 6/2001

* cited by examiner

*Primary Examiner* — Victor Kostak

(74) *Attorney, Agent, or Firm* — Westerman, Hattori, Daniels & Adrian, LLP

(57) ABSTRACT

An inputted picture signal is stored in an image memory into which a picture signal for at least one frame period can be written, while rewriting the memory. At a plurality of timings within one frame period, an average brightness calculation unit calculates an average brightness from the picture signal written into the image memory, and a brightness control unit performs brightness control of the picture signal read from the image memory based on the calculated average brightness.

16 Claims, 9 Drawing Sheets

PRIOR ART

PRIOR ART

APPARATUS AND METHOD FOR CONTROLLING DISPLAY BRIGHTNESS IN AN IMAGE DISPLAY DEVICE

BACKGROUND OF THE INVENTION

1. Field of the Invention

The present invention relates to an apparatus for displaying and controlling a picture signal, which has a PLE (Peak Luminance Enhancement) control means, for example, for finding an average brightness level (APL=Average Picture Level) of the picture signal to be displayed so as to control display brightness in an image display device by this average brightness level, and to a method of displaying and controlling the picture signal.

2. Description of the Related Art

For example, in PDP (plasma display panel) etc., the above-mentioned PLE control is carried out when displaying an image. This PLE control is arranged such that an average picture level (APL) of the picture signal corresponding to a field or the whole frame screen is detected, and a display brightness level which is a brightness level for actually displaying the image is set based on this average picture level.

In this case, as for the above-mentioned PLE control, in the case where the average picture level is low (or when the whole picture is dark) with respect to a signal having even the same brightness level, the display brightness level is set to be high so that high brightness display may be provided. On the other hand, in the case where the average picture level is high (when the whole picture is bright), the display brightness level is lowered so as to inhibit power consumption. By carrying out the PLE control in this way, it is possible to realize low power consumption and also possible to display an image of good contrast.

As described above, a display apparatus provided with a PLE control means which finds the average picture level APL of the picture signal to be displayed and controls the display brightness by this APL is disclosed in patent documents 1 and 2 as listed below, for example.

[Patent document 1] Japanese Patent Publication (KOKAI) No. H9-281927

[Patent document 2] Japanese Patent Publication (KOKAI) No. 2001-175220

When adjusting brightness of a display screen by using the above-mentioned PLE control means, an image memory for a plurality of screens (at least two frames) is generally needed in order to adjust the brightness of a display picture without delay by way of the PLE control. FIG. 1 shows a basic structure by a block diagram, reference sign A indicates a display control apparatus into which the picture signal is inputted, and reference sign B denotes an image display means for receiving the picture signal whose brightness is controlled by the above-mentioned display control apparatus A and displaying this picture signal.

The above-mentioned display control apparatus A is provided with first and second image memories 1*a* and 1*b* which can each write the picture signal for one frame. The picture signal to be inputted is first transmitted to the first image memory 1*a* (hereafter referred to as VRAMa), into which the picture signal for one frame is written. At the same time, the above-mentioned picture signal is transmitted to an APL unit (average brightness calculation means) 2, in which an average picture level (hereafter referred to as APLa) is calculated from the picture signal for the above-mentioned one frame. Then, information data on the average picture level APLa calculated in the APL unit 2 are sent to a brightness control unit (brightness control means) 3 as a control signal.

Subsequently, the picture signal of next frame is sent to the second image memory 1*b* (hereafter referred to as VRAMb) into which the picture signal for the above-mentioned next one-frame is written. At the same time, the picture signal for the above-mentioned next frame is sent to the APL unit 2, and an average picture level (hereafter referred to as APLb) is calculated from this picture signal for one frame.

During this time, the picture signal read from VRAMa is subjected to brightness control based on the average picture level APLa which corresponds to one previous frame in the brightness control unit 3, and is set as a display brightness level corresponding to the average picture level APLa. The picture signal for the previous one frame set as this display brightness level operates to be sent to the image display means B to display an image.

Then, the picture signal after being read from VRAMb is subjected to brightness control based on the average picture level APLb which corresponds to next one-frame in the brightness control unit 3, and is set as a display brightness level corresponding to the average picture level APLb. Similarly, the picture signal for the next one-frame set as this display brightness level is transmitted to the image display means B to display an image. That is, the above-mentioned operation is repeated one by one.

Incidentally, as shown in FIG. 1, the structure provided with the image memories for a plurality of frames leads to an increase in memory capacity. The increase in memory capacity brings about increasing costs of IC's which construct the memories, and results in increasing costs of a product inevitably. Therefore, for example, in a small display apparatus used for a portable telephone etc., it is often the case that a structure provided with an image memory for one frame as shown in FIG. 2 is employed, since it is difficult for the apparatus to have an image memory for a plurality of frames in view of its volume and cost.

In other words, reference numeral 1 shown in FIG. 2 is an image memory into which the picture signal for one frame can be written, and which corresponds to either one of the image memories indicated by reference signs 1*a* and 1*b* shown in FIG. 1 as already explained. Further, in a structure as shown in FIG. 2, parts performing the same functions as the already described parts in FIG. 1 are given identical reference signs. Accordingly, the description of these will not be repeated.

Since the image memory 1 used in the structure as shown in FIG. 2 has the capacity which allows the picture signal for one frame to be written in as described above, it operates so that a new picture signal is stored one by one into the image memory 1, while rewriting it (overwritten), as time goes on. FIG. 3 explains the operation, a horizontal axis shows elapsed time, and a vertical axis shows a progress state of write-in operation of writing the picture signal into the image memory (VRAM) 1. In addition, it can also be said that the vertical axis indicates an advance rate of a display scan.

As described above, as time goes on, with respect to the picture signal for the preceding (one frame before) old frame, the image memory 1 is overwritten by the picture signal for the following new frame one by one. Therefore, when trying to realize the above-mentioned PLE control, a delay of one frame period (at maximum) arises in the display brightness according to a display frame and APL. As a result, a display portion corresponding to the new frame takes place, which is displayed and controlled based on the average brightness of the old frame as shown by a dotted hatch part C in FIG. 3.

Now, for example, in the case where the picture signal of the old frame is of a dark image and the picture signal of the new frame is of a bright image, since the above-mentioned PLE control is carried out such that the brightness of the bright image of the new frame is controlled by APL based on the dark image of the old frame, it operates so that a level of each peak brightness of the bright image of the new frame may be further raised. For this reason, there arises a problem that a bright image is displayed still more brightly at an instant in time. At the same time, there arises another problem that an excessive load is momentarily applied to a power supply circuit, because large drive current may flow to each of the display pixels to be lit which have a high proportion of the image display means.

SUMMARY OF THE INVENTION

The present invention is made in view of the above-mentioned problems, and aims to provide a display control apparatus and a display control method for a picture signal, which can avoid the disadvantage of image display as described above, and the problem that the electrical overload is applied to the power supply circuit while using the image memory of small capacity.

As defined in claim 1, a fundamental aspect of the display control apparatus in accordance with the present invention made in order to solve the above-mentioned problems is a display control apparatus for driving and controlling a display means for displaying an image based-on an inputted picture signal, the display control apparatus including an average brightness calculation means for calculating an average brightness of the above-mentioned picture signal and a brightness control means for controlling the brightness of the above-mentioned picture signal based on the above-mentioned average brightness obtained by the above-mentioned average brightness calculation means, wherein the above-mentioned average brightness calculation means is arranged to calculate the average brightness of the picture signal a plurality of times within one frame period, and to carry out brightness control of the above-mentioned brightness control means based on the above-mentioned calculated average brightness.

Further, a fundamental aspect of a display control method in accordance with the present invention made in order to solve the above-mentioned problems is a display control method for driving and controlling a display means for displaying an image based on an inputted picture signal, characterized in that an average brightness of the picture signal is calculated a plurality of times within one frame period, and brightness control operation is carried out for controlling the brightness of the picture signal supplied to the above-mentioned display means based on the above-mentioned calculated average brightness.

DESCRIPTION OF THE PREFERRED EMBODIMENTS

Figure 1:
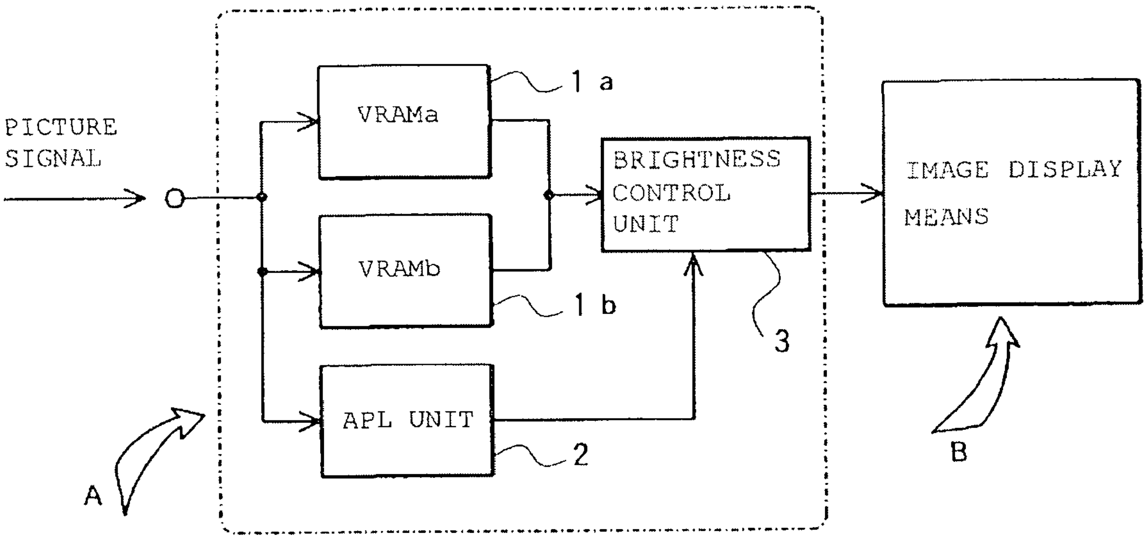
FIG. 1 is a block diagram showing an example of a basic structure of a conventional display control apparatus.
Figure 2:
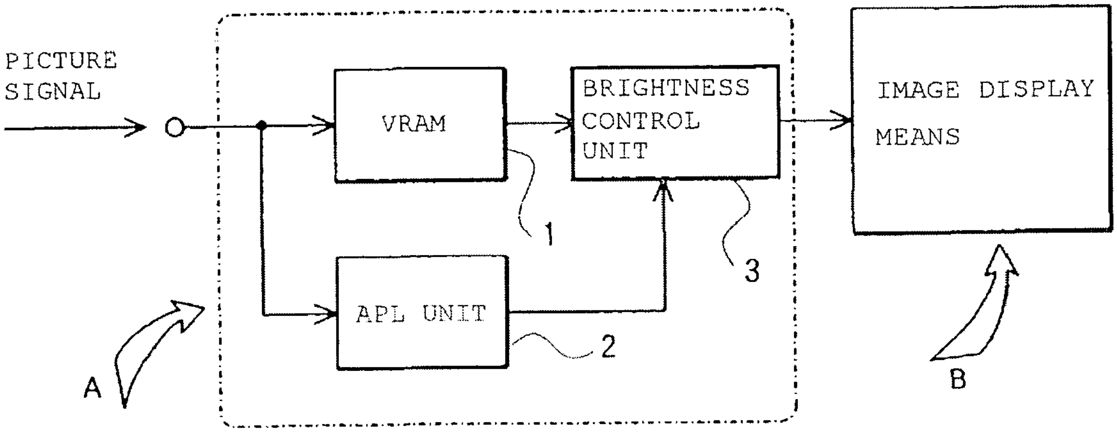
PRIOR ART Fig. 2
FIG. 2 is a block diagram showing another example of the basic structure of the conventional display control apparatus.
Figure 4:
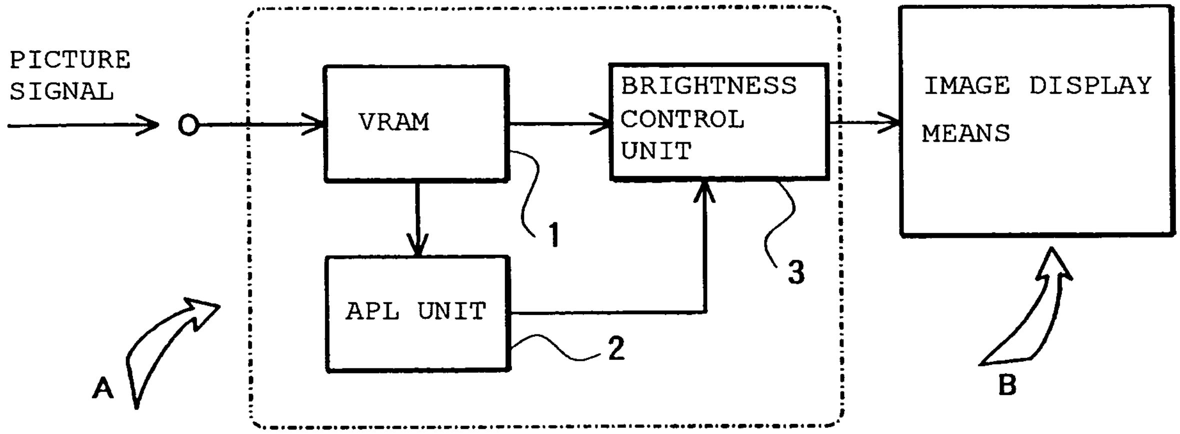
FIG. 4 is a block diagram showing a basic structure of a display control apparatus in accordance with the present invention.

Hereafter, a display control apparatus for a picture signal in accordance with the present invention will be described with reference to preferred embodiments shown in the drawings. FIG. 4 illustrates a basic structure of the display control apparatus in accordance with the present invention by means of a block diagram. Further, in the structure as shown in FIG. 4, parts performing the same functions as the already described parts in FIG. 2 are given identical reference signs. Accordingly, the description of these will not be repeated.

As with the example shown in FIG. 2, an image memory 1 used in the structure as shown in FIG. 4 has a capacity which allows the picture signal for one frame to be written, and therefore it operates so that a new picture signal is stored one by one into the image memory 1, while rewriting it (overwritten), as time goes on. An APL unit 2 which constitutes an average brightness calculation means is arranged to calculate an average brightness by using the picture signal written into the above-mentioned image memory 1.

Figure 3:
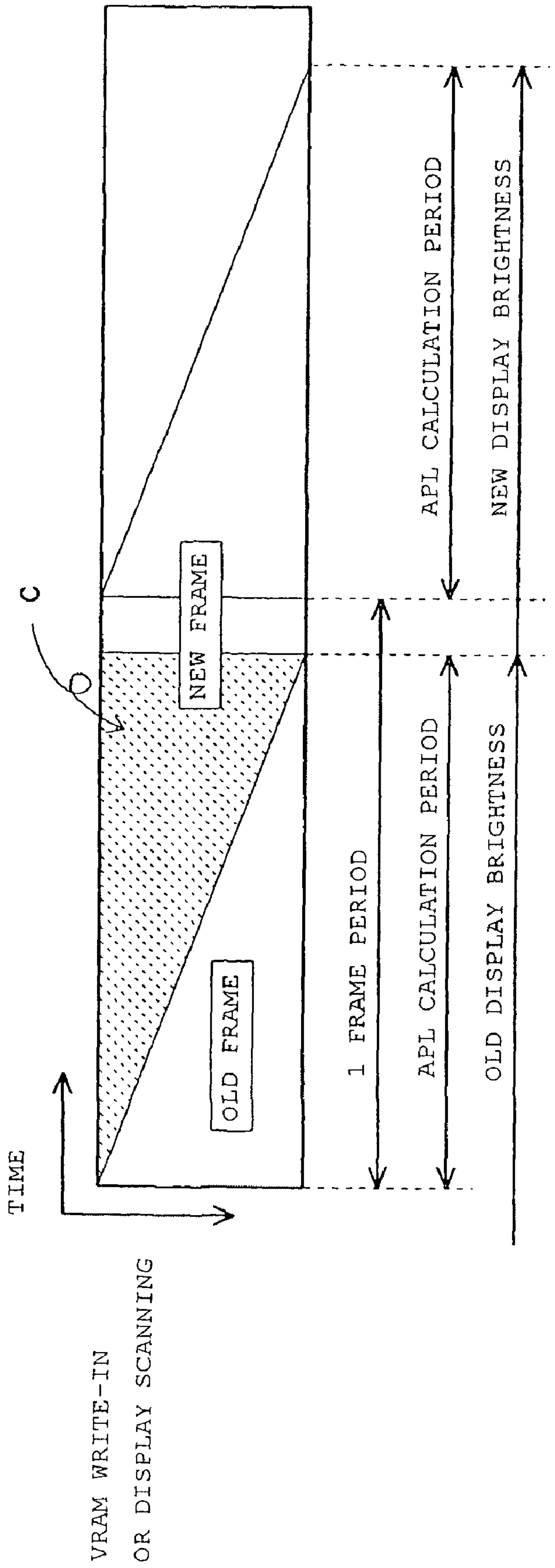
FIG. 3 is a timing chart for explaining a PLE operation of the display control apparatus as shown in FIG. 2.
Figure 5:
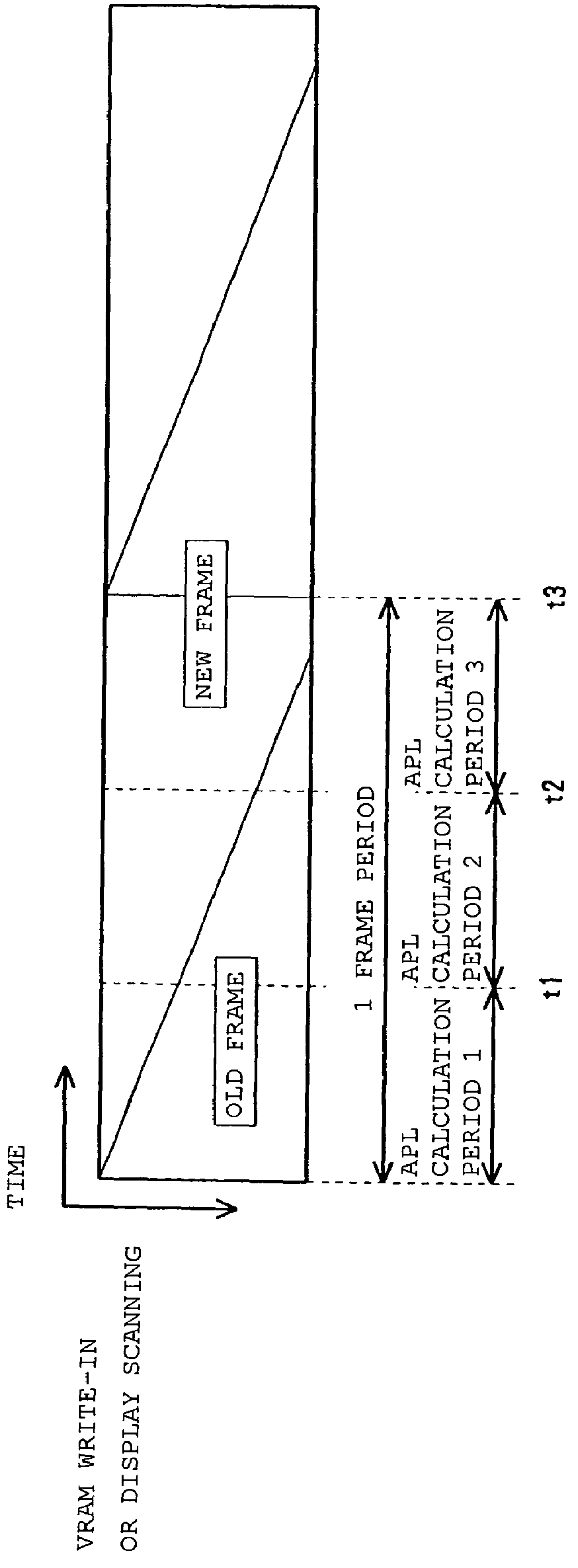
FIG. 5 is a timing chart for explaining a PLE operation of the display control apparatus as shown in FIG. 4.

FIG. 5 is for explaining operation of a display control apparatus A as shown in FIG. 4, which is shown in the same manner as already described in FIG. 3. In the preferred embodiment of this display control apparatus, as shown in FIG. 5, one frame period is divided into a plurality of periods, and it operates to calculate an average brightness (APL) of the picture signal for each period.

In other words, the example shown in FIG. 5 illustrates an example in which one frame period is divided into three periods in order to simplify the description. They are illustrated as an APL calculation period 1, an APL calculation period 2, and an calculation period 3. By using the picture signal written into the image memory 1, the APL unit 2 calculates APL three times within one frame period, and it operates so that the calculated APL may be transmitted to the brightness control unit 3 as a control signal each time.

On the other hand, the picture signal whose one frame period is divided into three and which is written into the image memory 1 is read one by one for each of the above-mentioned divided periods, and is supplied to the brightness control unit 3. As a result, the picture signal corresponding to the new frame written, for example, in the APL calculation period 1 as shown in FIG. 5 is read one by one and is supplied to the brightness control unit 3 within the APL calculation period 2. In this case, APL in t1 that is the last timing of the APL calculation period 1 is supplied to the brightness control unit 3 as the control signal.

In other words, the picture signal written into the image memory 1 in the APL calculation period 1 is subjected to the brightness control of APL of the picture signal written into the image memory 1 in the above-mentioned t1, and supplied to the image display means B. Similarly, the picture signal written into the image memory 1 in the APL calculation period 2 operates to be subjected to the brightness control of APL of the picture signal written into the image memory 1 in t2 and supplied to the image display means B. Furthermore, the picture signal written into the image memory 1 in the APL calculation period 3 similarly operates to be subjected to the brightness control of APL of the picture signal written into the image memory 1 in t3 and supplied to the image display means B.

Now, the picture signal written into the image memory 1 in the above-mentioned t1 has a large proportion of the picture signal of the old frame out of the picture signals of the old frame and the new frame. Further, the picture signal written into the image memory 1 in the above-mentioned t2 has a larger proportion of the picture signal of the new frame out of the picture signals of the old frame and the new frame. Furthermore, the whole picture signal written into the image memory 1 in the above-mentioned t3 has the picture signal of the new frame.

Therefore, as already described, the picture signal of the old frame provides a dark image, for example. In the case where the picture signal of the new frame provides a bright image, bright picture signals written into the image memory 1 in the APL calculation period 1 and the APL calculation period 2 are each subjected to the brightness control of APL in the state where the picture signal of the new frame is written in at a predetermined rate to the old frame.

Thus, the brightness of the bright image of the new frame is controlled only by APL of the image data of the dark old frame, and it is possible to solve the problem that the brightness may be extremely increased, which naturally leads to solving the problem that excessive peak current momentarily flows through the power supply circuit.

Incidentally, as described above, in the example shown in FIG. 5, all the picture signals written into the image memory 1 in t3 are the picture signals of the new frame. Therefore, the bright picture signal written into the image memory 1 in the APL calculation period 3 is subjected to the brightness control of APL of the new frame only, and can expect a normal PLE control operation.

In addition, in order to facilitate understanding of the operation, the above description is concerned with the operation of writing the picture signal into image memory and a synchronous type in which the operation of the picture signal reading from the image memory is synchronous, however an asynchronous type can also provides similar operational effects.

FIGS. 6-9 show particular examples in which the above-mentioned display control apparatus and display control method in accordance with the present invention are employed, and these show the example of the display control apparatus for an active-matrix type display panel using an organic EL (electroluminescence) element for a pixel of the display panel.

Figure 6:
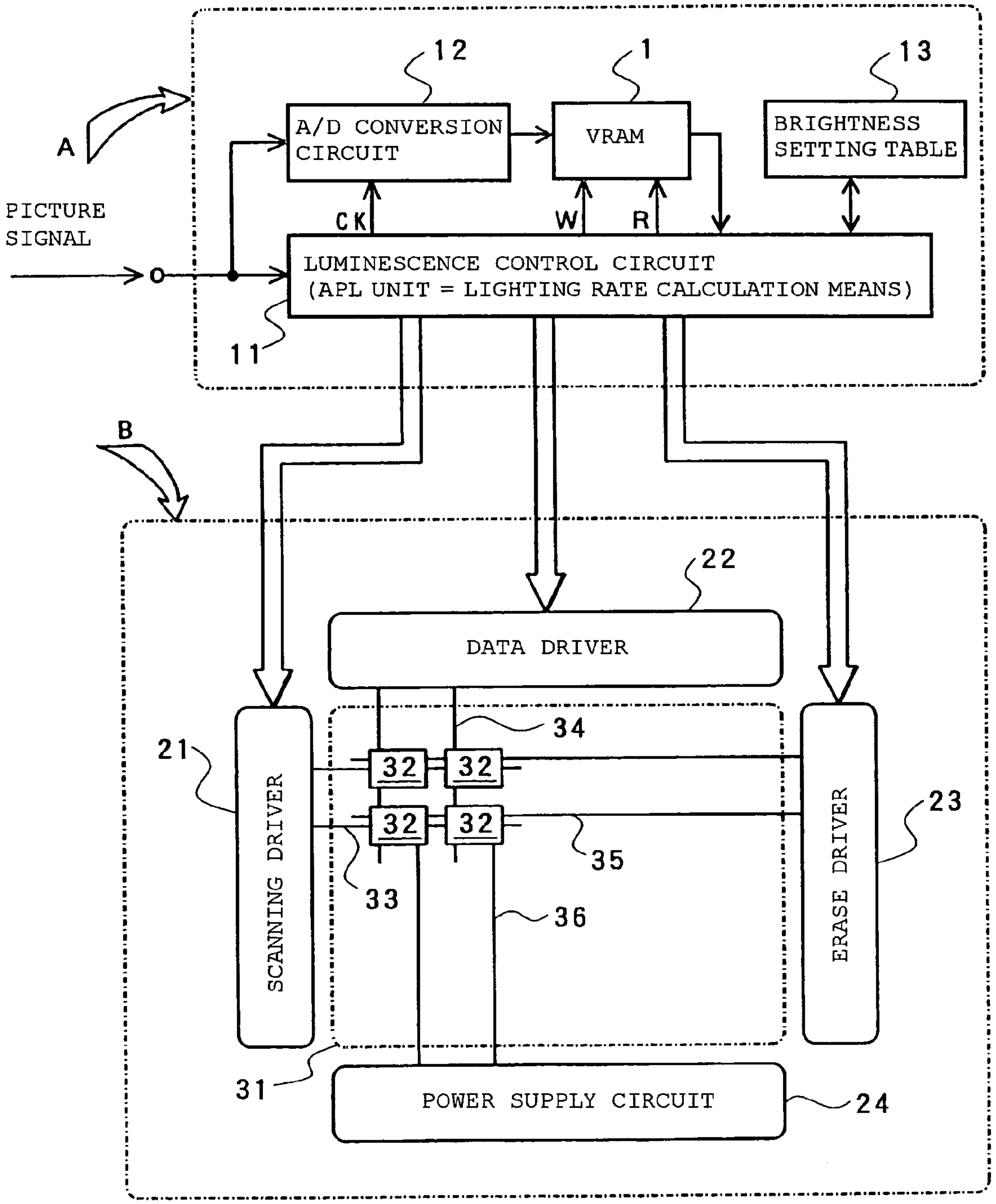
FIG. 6 is a block diagram showing a preferred embodiment of the display control apparatus employing the present invention.

FIG. 6 shows the whole structure, reference sign A shows the already explained display control apparatus, and reference sign B indicates the image display means, and reference numeral 1 denotes the already explained image memory. The display control apparatus A is provided with a luminescence control circuit 11, and an analog/digital (A/D) conversion circuit 12, the image memory 1, and a brightness setting table 13 are connected to this luminescence control circuit 11.

Further, in the preferred embodiment as shown in this FIG. 6, it is arranged that an analog picture signal may be supplied to the luminescence control circuit 11 and the A/D conversion circuit 12. Based on horizontal and vertical synchronizing signals in the analog picture signal, the above-mentioned luminescence control circuit 11 generates a clock signal CK for the above-mentioned A/D conversion circuit 12 and a write-in signal W and a read-out signal R for the above-mentioned image memory 1.

Further, based on the horizontal and vertical synchronizing signals in the above-mentioned picture signal, the luminescence control circuit 11 operates to generate a synchronization signal for a scanning driver 21, a data driver 22, and an erase driver 23 in the image display means B to be described later.

Based on the clock signal supplied from the luminescence control circuit 11, the above-mentioned A/D conversion circuit 12 operates to sample an inputted analog signal and convert this into image data for each pixel, which are supplied to the image memory 1. According to the write-in signal W from the above-mentioned luminescence control circuit 11, the above-mentioned image memory 1 operates such that each of pixel data supplied from the A/D conversion circuit 12 may be written into the image memory 1 one by one.

As already described, the above-mentioned image memory 1 is arranged to have the capacity which allows the picture signal for one frame to be written in, and it operates so that data for one screen (one frame) in the display panel, as will be described later, are written in by way of the above-mentioned writing operation, then the picture signal for the next one-frame is stored one by one, while rewriting the memory (overwritten).

At the same time, the picture signals (pixel data) written into the image memory 1 are read one by one from the above-mentioned memory 1 according to the read-out signal R supplied from the luminescence control circuit 11, and displayed on the display panel as an image in a situation of being subjected to the brightness control by PLE, as will be described later.

In addition, the above-mentioned luminescence control circuit 11 operates so that APL may be calculated from the image data written into the picture memory in synchronization with a sub-frame period to be described later. In this case, the above-mentioned APL is obtained such that a proportion (lighting rate) of the pixels to be lit and controlled in the display panel 31 to be mentioned later is calculated from the pixel data written into the above-mentioned image memory 1. Therefore, the luminescence control circuit 11 achieves the function as a lighting rate calculation means, and this similarly functions as the already described APL unit 2.

Further, based on the calculated lighting rate, the luminescence control circuit 11 operates to carry out a PLE operation by referring to the above-mentioned brightness setting table 13. As for this PLE operation, with reference to the brightness setting table 13 based on the above-mentioned lighting rate, it operates so that a suitable control signal may be generated for the data driver 22 and the erase driver 23 which constitute the image display means B. In addition, the operation of the data driver 22 and the erase driver 23 at this time will be described in detail later.

Now, reference numeral 31 in the image display means B indicates the display panel in which a large number of pixels 32 each containing an organic EL element are arranged in a matrix pattern. Arranged at this display panel 31 are scanning lines 33, data lines 34, and erase signal lines 35 which are respectively connected to the above-mentioned scanning driver 21, the data driver 22, and the erase driver 23. The pixels 32 containing the above-mentioned EL element are respectively arranged at these intersections. In addition, it is arranged that a voltage for lighting and driving the pixel is supplied from a power supply circuit 24 through a power supply line 36 to each of the above-mentioned pixels 32.

Figure 7:
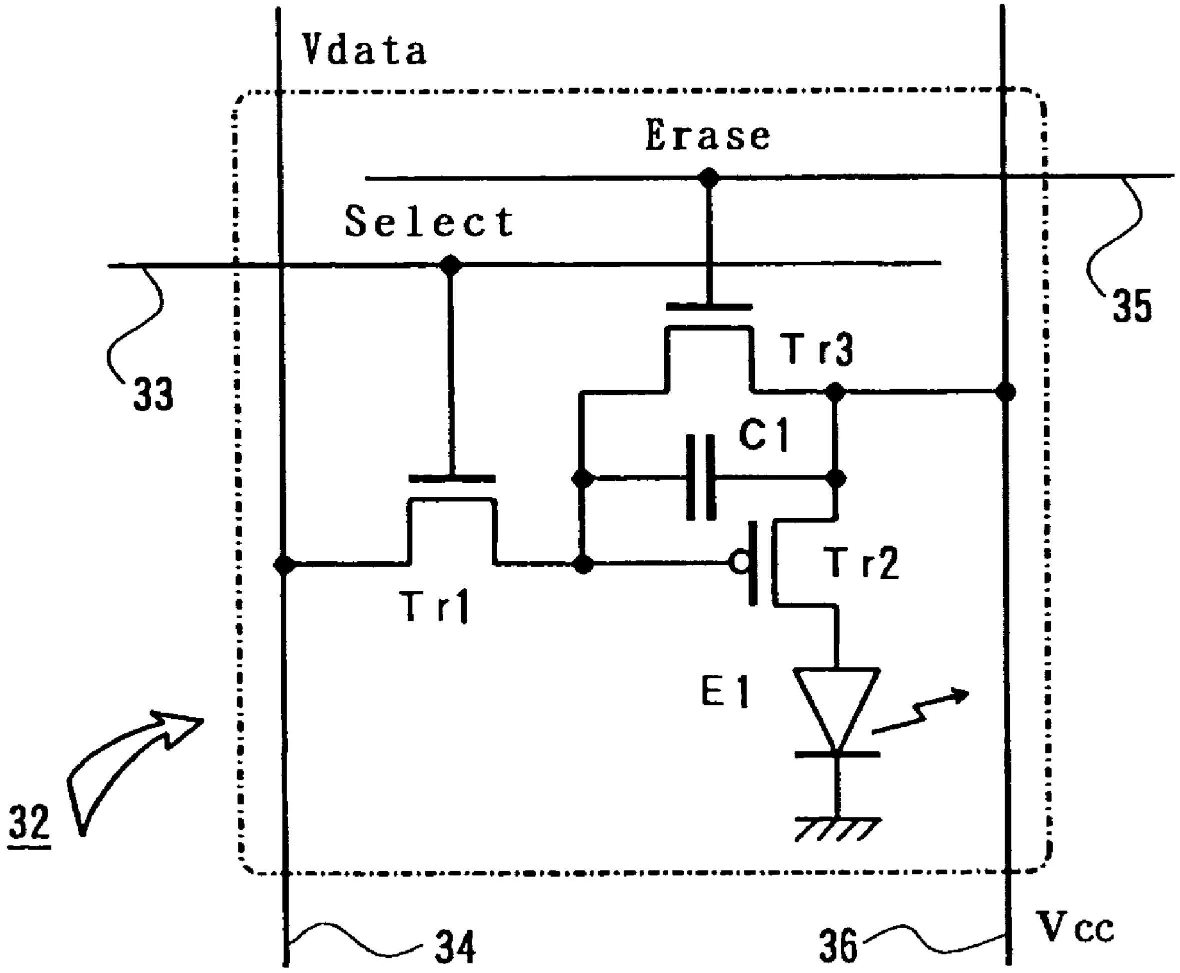
FIG. 7 is a circuit diagram showing an example of a structure of a pixel arranged at a display panel as shown in FIG. 6.

FIG. 7 shows a circuit structure corresponding to one pixel 32 arranged at the above-mentioned display panel 31. This pixel 32 is arranged so that a data signal Vdata corresponding to the picture signal from the above-mentioned data driver 22 may be supplied to a source of TFT for control, i.e., a data write-in transistor Tr1, through the data line 34 arranged at the display panel.

It is arranged that a scanning signal Select (hereafter also referred to as a write-in pulse) may be supplied to a gate of the above-mentioned data write-in transistor Tr1 through the scanning line 33 connected to the scanning driver 21. A drain of the above-mentioned data write-in transistor Tr1 is connected to a gate of a lighting and driving TFT i.e., a lighting and driving transistor Tr2 and also connected to one terminal of a capacitor C1 for holding electric charges.

Further, a source of the lighting and driving transistor Tr2 is arranged to be connected with the other terminal of the above-mentioned capacitor C1 and supplied with a drive voltage Vcc via the power supply line 36. A drain of the above-mentioned lighting and driving transistor Tr2 is connected to an anode terminal of an organic EL element E1, and a cathode terminal of this organic EL element E1 is connected to a reference potential point (ground).

Furthermore, it is arranged that a gate of an erase transistor Tr3 as TFT for erase is supplied with an erase signal Erase (also referred to as an erase pulse) from an erase driver through the erase signal line 35. A source and a drain of the erase transistor Tr3 are connected to both terminals of the above-mentioned capacitor C1, respectively.

In addition, in the circuit structure of the pixel 32 as shown in FIG. 7, only the drive transistor Tr2 is constituted by a p-channel type TFT, and others are constituted by an n-channel type TFT. As shown in FIG. 6, a large number of the pixels 32 having the above-mentioned arrangement are disposed in a matrix pattern in row and column directions so as to constitute the display panel 31.

In the structure of the pixels 32 as shown in FIG. 7, the write-in pulse Select as a scanning signal is supplied to the gate of the control transistor Tr1 from the scanning driver 21 in an address period. Thus, the current corresponding to the data signal Vdata supplied from the data driver 22 flows into the capacitor C1 through the source and a drain of the control transistor Tr1, and the capacitor C1 is charged. Then, the charge voltage is supplied to the gate of the drive transistor Tr2, the transistor Tr2 causes the current corresponding to its gate voltage and the drive voltage Vcc supplied to the drain to flow into the above-mentioned EL element E1, whereby the EL element E1 emits light.

When the application of the above-mentioned write-in pulse to the gate of the above-mentioned control transistor Tr1 is stopped, the transistor Tr1 is so-called cut off. However, the gate voltage of the drive transistor Tr2 is held by the electric charge accumulated in the capacitor C1, whereby the drive current to the EL element E1 is maintained. Therefore, the EL element E1 can continue a lighting state corresponding to the above-mentioned data signal Vdata in a period (one sub-frame period as will be described later) until the next address operation.

On the other hand, in the middle of the lighting period of the above-mentioned EL element E1 (in the middle of one sub-frame period), the erase pulse Erase which causes the erase transistor Tr3 to turn on is supplied from the above-mentioned erase driver 23, whereby the electric charge charged in the capacitor C1 can be eliminated (discharged) instantaneously. As a result, the drive transistor Tr2 is in a cut-off state, and the EL element E1 is turned off immediately. In other words, the lighting period in one sub-frame of the EL element E1 is controlled by controlling an output timing of the erase pulse Erase from the erase driver 23, so that predetermined gamma characteristics and dimmer characteristics can be realized.

Figure 8:
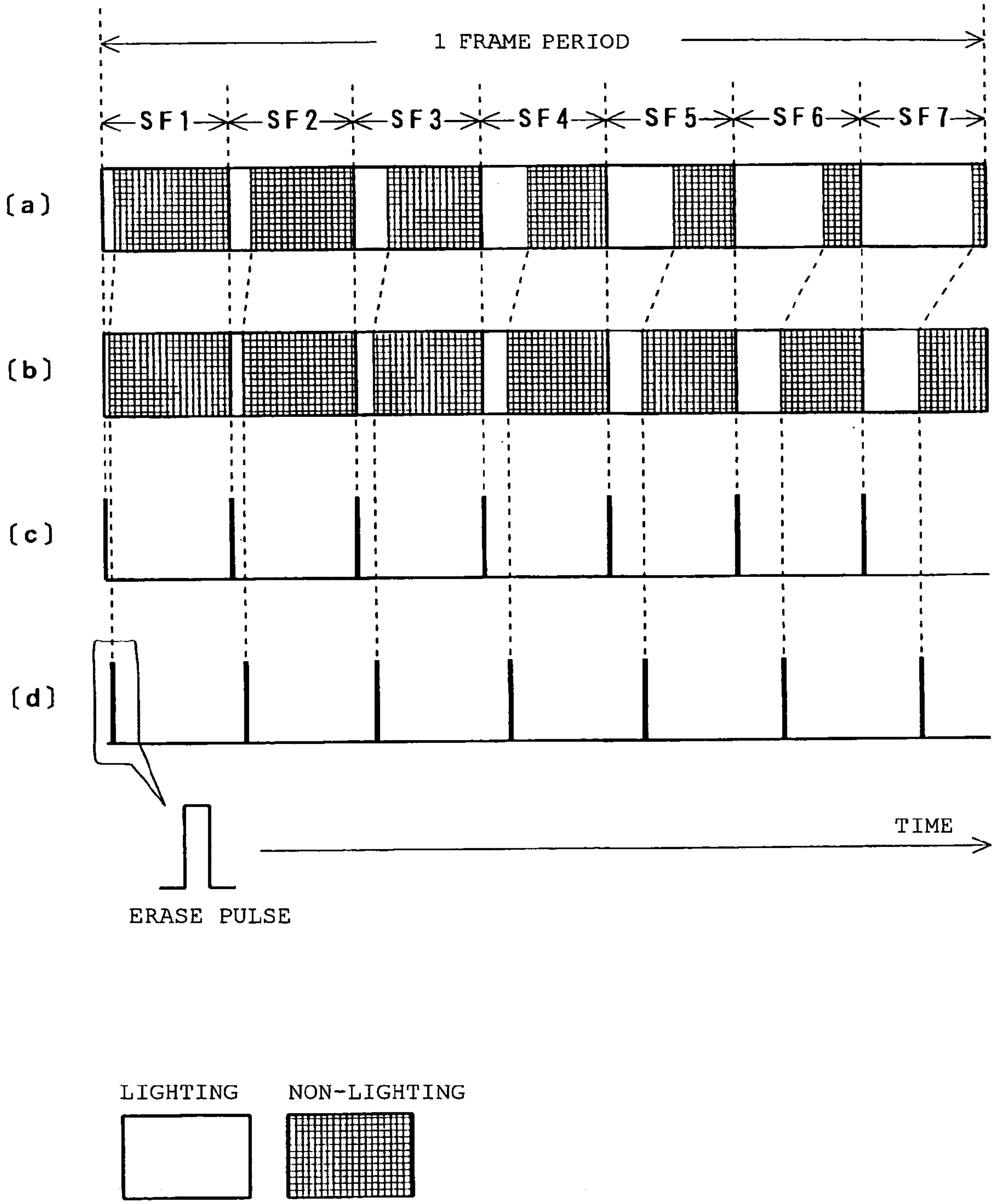
FIG. 8 is a timing chart for explaining operation in the display control apparatus as shown in FIG. 6.

FIG. 8 is for explaining the PLE control carried out by means of the structure as shown in FIGS. 6 and 7. For realizing this PLE control, in the present embodiment, a gradation control means is employed which divides one frame (period) into a plurality of sub-frames to realize gradation control by summing the lighting periods of the pixel in this sub-frame.

In other words, FIG. 8 shows an example in which, in order to simplify the explanation, one frame (period) is divided into seven sub-frames (SF1-SF7) to realize eight gradation expressions (100% non-lighting can also be considered as one gradation to provide 7+1 gradation expressions) by selecting each sub-frame in one-frame period.

FIGS. 8(*a*) and 8(*b*) show an example in which the rates (proportions) of the lighting period and the non-lighting period for each sub-frame are controlled according to the lighting rate (lighting rate of the pixel written into the above-mentioned VRAM1) of the above-mentioned pixel 32 arranged at the display panel 31. Namely, FIG. 8(*a*) shows the case where the rate of the lighting period for each sub-frame is large, and FIG. 8(*b*) shows the case where the rate of the lighting period for each sub-frame is small. In addition, both FIGS. 8(*a*) and 8(*b*) show an example where gamma values of the gradation characteristics are the same, and dimmer characteristics are changed.

Now, when the lighting rate of the pixel is low (that is, when APL is small), lighting control as shown in FIG. 8(*a*) is performed. When the lighting rate of the pixel is high (or APL is large), it is controlled so that the lighting control as shown in FIG. 8(*b*) may be performed. In short, according to a degree of the lighting rate of the pixel, the rate (proportion) of the lighting period for each sub-frame is controlled to change between those in FIGS. 8(*a*) and 8(*b*). Thus, when the lighting rate of the pixel is considerably high, and a total sum of the lighting periods of the pixel within one frame period is reduced, and a drive current (value) supplied to each pixel can be controlled.

FIG. 8(*c*) and FIG. 8(*d*) are for explaining a generating timing of the above-mentioned write-in pulse and erase pulse in the case of realizing the lighting control as shown in FIG. 8(*b*). In other words, in the example as shown in FIG. 8, the write-in pulse shown in FIG. 8(*c*) takes place in synchronization with start of each sub-frame, whereby the pixel is caused to be the lighting state. The erase pulse as shown FIG. 8(*d*) takes place in the middle of the lapse of time in the sub-frame, whereby the pixel is changed into a non-lighting state.

Here, when trying to realize the gradation "8" (for example), a series of lighting patterns as shown in FIG. 8(*a*) or FIG. 8(*b*) are carried out for the pixel in one frame period. When trying to realize the gradation "5" (for example), lighting drive operation is performed in the periods Sf1-Sf4 as shown in FIG. 8(*a*) or FIG. 8(*b*). All the periods Sf5-Sf7 thereafter of each sub-frame are caused to be a turn-off state. Thus, the emission brightness can be obtained according to the total sum of the lighting periods of the pixel in one frame period.

The erase pulse as shown in FIG. 8(*d*) can be generated according to the structure shown in FIG. 9 as will be described below. Reference numeral 38 in FIG. 9, reference numeral 39, and reference numeral 13 respectively indicate a sub-frame counter, a logical operation unit, and the brightness setting table as described with reference to FIG. 6. In other words, as shown in FIG. 6, it is arranged that the above-mentioned brightness setting table 13 is caused to be external to the luminescence control circuit 11, and the sub-frame counter 38 and the logical operation unit 39 are built in the luminescence control circuit 11.

Corresponding to the above-mentioned lighting rate, the lighting period for each sub-frame is stored in the above-mentioned brightness setting table 13 as a parameter. When the number of a sub-frame to be lit and controlled is supplied from the sub-frame counter 38 to the logical operation unit 39, the logical operation unit 39 accesses the table 13 and operates so that an output timing signal of the above-mentioned erase pulse may be generated based on the parameter of the lighting time stored corresponding to the number of the sub-frame.

This is generated as the output timing signal of the erase pulse for every sub-frame each corresponding to the lighting rate of the pixel as shown in FIG. 8(*d*). This timing signal is supplied to the above-mentioned erase driver 23 and operates so that the erase pulse may be outputted from the erase driver 23 for each sub-frame as described above.

Figure 9:
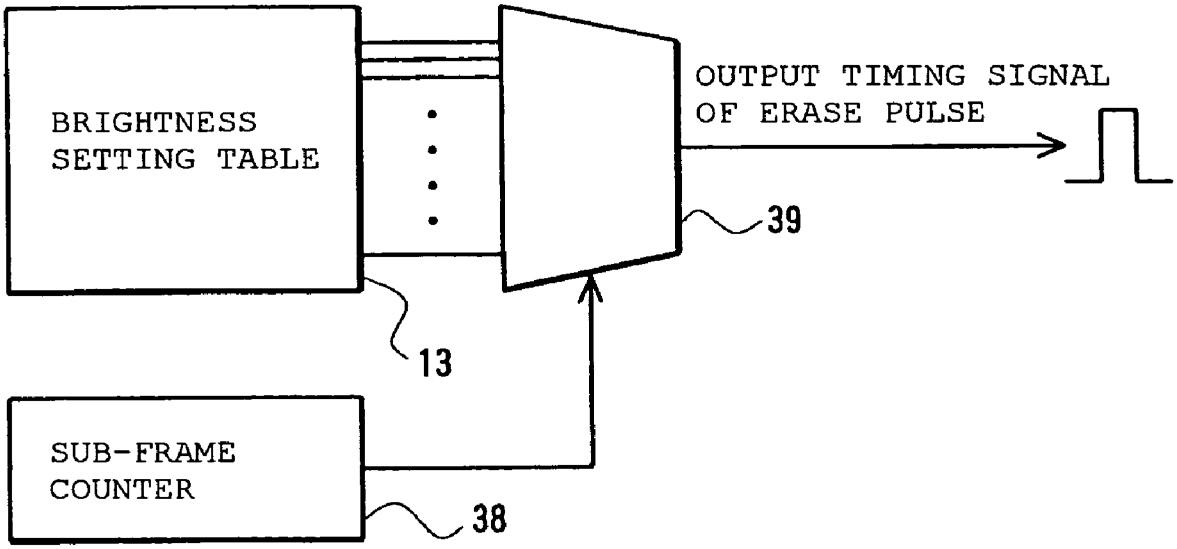
FIG. 9 is a block diagram for explaining a basic function of a brightness setup used in the structure as shown in FIG. 6.

In addition, in this preferred embodiment, it operates so that the above-mentioned lighting rate is calculated in synchronization with the sub-frame from the picture signal written into the picture memory 1 and that, based on this lighting rate, the output timing signal of the erase pulse may be generated by accessing the brightness setting table 13, according to the structure shown in FIG. 9.

Therefore, this allows the brightness control (PLE control) based on the lighting rate (=APL) for each sub-frame. Similarly to the operational effects as described with reference to the basic structure shown in FIGS. 4 and 5, while using the image memory of small capacity (for one frame), it is possible to avoid the disadvantage that maldisplay takes place and to solve the problem of applying the overload to the power supply circuit.

Further, in the preferred embodiments as shown in FIGS. 6-9, as previously described, the lighting rate (=APL) is calculated in synchronization with each sub-frame by accessing VRAM1 for each sub-frame. Based on this calculation result, the brightness control (PLE control) is carried out each time. In other words, this operation can be schematically shown in FIG. 10.

Figure 10:
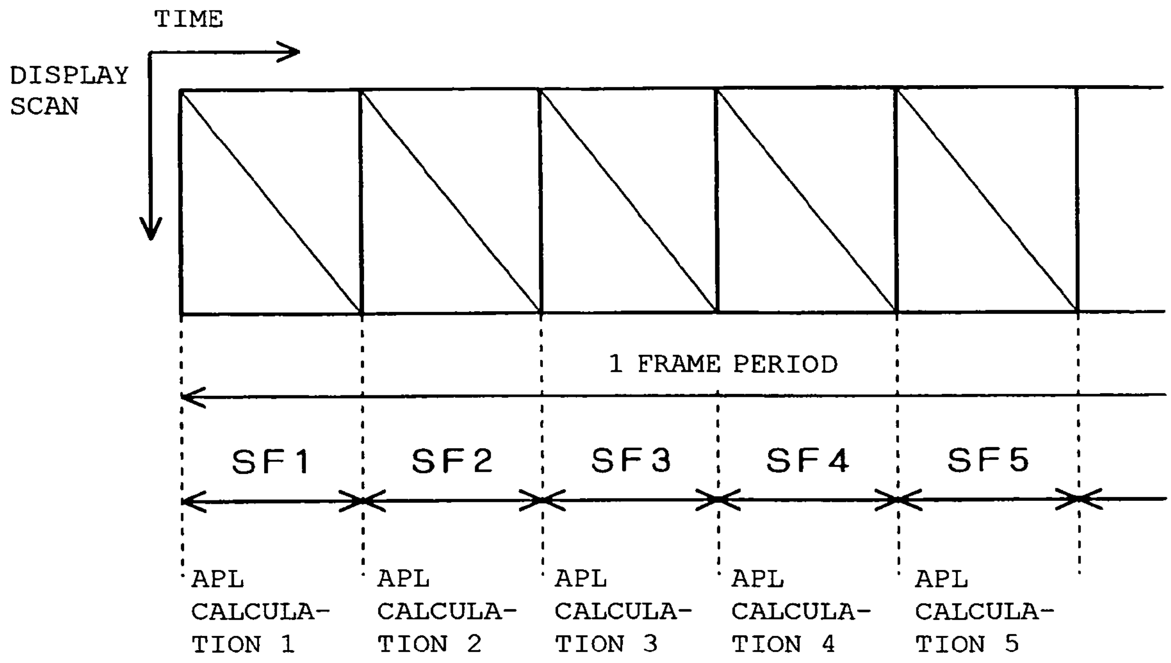
FIG. 10 is a timing chart for explaining APL calculation operation carried out in the display control apparatus in accordance with the present invention.
Figure 11:
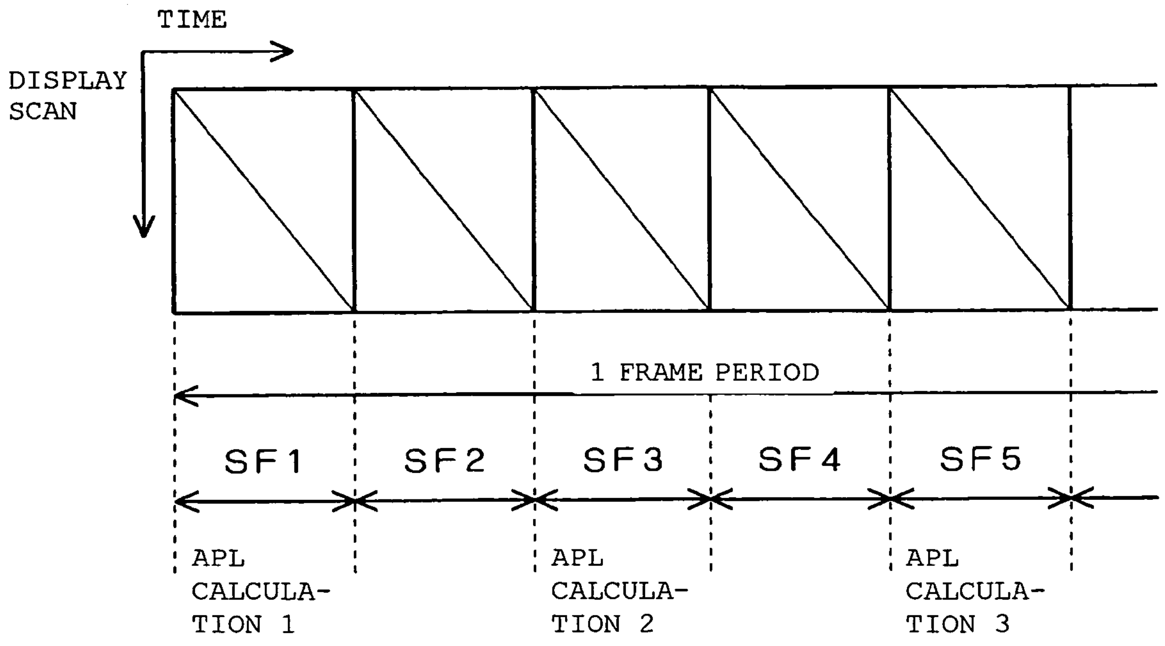
FIG. 11 is a timing chart for explaining another APL calculation operation which is similarly carried out.

However, actually one frame (period) is divided into a larger number of sub-frames, so as to realize practical gradation control using 32 steps, 64 steps, etc., for example. In such a case, as shown in FIG. 10, it is not necessarily to calculate the lighting rate (=APL) by accessing VRAM1 for each sub-frame. For example, as shown in FIG. 11, it is possible to access VRAM1 for each of the plurality of sub-frames to calculate the lighting rate (=APL) and to perform the brightness control (PLE control) based on this lighting rate in the next plurality of sub-frame periods.

What is claimed is:

1. A display control apparatus for driving and controlling a display means for displaying an image based on an inputted picture signal, said display control apparatus comprising:

an average brightness calculation means for calculating an average brightness of said picture signal, and a brightness control means for controlling the brightness of said picture signal based on said average brightness obtained by said average brightness calculation means, wherein said average brightness calculation means is arranged to calculate the average brightness of the picture signal a plurality of times within one frame period, and to carry out brightness control of said brightness control means based on said calculated average brightness, and at least one of said average brightnesses calculated a plurality of times within one frame period is calculated based on said picture signals contained in mutually different frames.

2. The display control apparatus for the picture signal as claimed in claim 1, characterized by being arranged such that one frame (period) is divided into a plurality of sub-frames so as to drive and control the display means for realizing gradation control by summing lighting periods of a pixel in said sub-frame, and said average brightness calculation means calculates said average brightness in synchronization with said sub-frame.

3. The display control apparatus for the picture signal as claimed in claim 2, characterized by being arranged so that said average brightness may be calculated for each of said sub-frames.

4. A display control apparatus for driving and controlling a display means for displaying an image based on an inputted picture signal, said display control apparatus comprising:

an average brightness calculation means for calculating an average brightness of said picture signal, and a brightness control means for controlling the brightness of said picture signal based on said average brightness obtained by said average brightness calculation means, wherein said average brightness calculation means is arranged to calculate the average brightness of the picture signal a plurality of times within one frame period, and to carry out brightness control of said brightness control means based on said calculated average brightness, and said display control apparatus being arranged such that the inputted picture signal is written in an image memory into which a picture signal for at least one frame period can be written, and said average brightness calculation means calculates an average brightness from said picture signal written in said image memory at said plurality of timings within one frame period, and wherein at least one of said average brightnesses calculated a plurality of times within one frame period is calculated based on said picture signals contained in mutually different frames.

5. The display control apparatus for the picture signal as claimed in claim 4, characterized by being arranged such that one frame (period) is divided into a plurality of sub-frames so as to drive and control the display means for realizing gradation control by summing lighting periods of a pixel in said sub-frame, and said average brightness calculation means calculates said average brightness in synchronization with said sub-frame.

6. The display control apparatus for the picture signal as claimed in claim 5, characterized by being arranged so that said average brightness may be calculated for each of said sub-frames.

7. The display control apparatus for driving and controlling a display means for displaying an image based on an inputted picture signal, said display control apparatus comprising:

an average brightness calculation means for calculating an average brightness of said picture signal, and a brightness control means for controlling the brightness of said picture signal based on said average brightness obtained by said average brightness calculation means, wherein said average brightness calculation means is arranged to calculate the average brightness of the picture signal a plurality of times within one frame period, and to carry out brightness control of said brightness control means based on said calculated average brightness, and said display control apparatus being arranged such that one frame (period) is divided into a plurality of sub-frames so as to drive and control the display means for realizing gradation control by summing lighting periods of a pixel in said sub-frame, and said average brightness calculation means calculates said average brightness in synchronization with said sub-frame.

8. The display control apparatus for the picture signal as claimed in claim 7, characterized by being arranged so that said average brightness may be calculated for each of said sub-frames.

9. A display control apparatus for driving and controlling a display means for displaying an image based on an inputted picture signal, said display control apparatus comprising:

an average brightness calculation means for calculating an average brightness of said picture signal, and a brightness control means for controlling the brightness of said picture signal based on said average brightness obtained by said average brightness calculation means, wherein said average brightness calculation means is arranged to calculate the average brightness of the picture signal a plurality of times within one frame period, and to carry out brightness control of said brightness control means based on said calculated average brightness, said display control apparatus being arranged such that the inputted picture signal is written in an image memory into which a picture signal for at least one frame period can be written, and said average brightness calculation means calculates an average brightness from said picture signal written in said image memory at said plurality of timings within one frame period, and said display control apparatus being arranged such that one frame (period) is divided into a plurality of sub-frames so as to drive and control the display means for realizing gradation control by summing lighting periods of a pixel in said sub-frame, and said average brightness calculation means calculates said average brightness in synchronization with said sub-frame.

10. The display control apparatus for the picture signal as claimed in claim 9, characterized by being arranged so that said average brightness may be calculated for each of said sub-frames.

11. A display control method for driving and controlling a display means for displaying an image based on an inputted picture signal, comprising:

calculating an average brightness of the picture signal a plurality of times within one frame period, and carrying out brightness control operation for controlling brightness of the picture signal supplied to said display means based on said calculated average brightness, and calculating at least one of said average brightnesses calculated a plurality of times within one frame period based on said picture signals contained in mutually different frames.

12. A display control method for the picture signal as claimed in claim 11, wherein the brightness of the picture signal supplied to said display means is controlled such that the brightness reduces as said calculated average brightness becomes higher than a predetermined parameter value.

13. A display control method for driving and controlling a display means for displaying an image based on an inputted picture signal, comprising:

calculating an average brightness of the picture signal a plurality of times within one frame period, and carrying out brightness control operation for controlling brightness of the picture signal supplied to said display means based on said calculated average brightness, storing the inputted picture signal in an image memory into which a picture signal for at least one frame period can be written, while rewriting it, and calculating the average brightness from said picture signal written in said image memory at said plurality of timings within one frame period, and calculating at least one of said average brightnesses calculated a plurality of times within one frame period based on said picture signals contained in mutually different frames.

14. A display control method for the picture signal as claimed in claim 13, wherein the brightness of the picture signal supplied to said display means is controlled such that the brightness reduces as said calculated average brightness becomes higher than a predetermined parameter value.

15. A display control method for driving and controlling a display means for displaying an image based on an inputted picture signal, comprising:

calculating an average brightness of the picture signal a plurality of times within one frame period, and carrying out brightness control operation for controlling brightness of the picture signal supplied to said display means based on said calculated average brightness, and controlling the brightness of the picture signal supplied to said display means such that the brightness reduces as said calculated average brightness becomes higher than a predetermined parameter value.

16. A display control method for driving and controlling a display means for displaying an image based on an inputted picture signal, comprising:

calculating an average brightness of the picture signal a plurality of times within one frame period, and carrying out brightness control operation for controlling brightness of the picture signal supplied to said display means based on said calculated average brightness, storing the inputted picture signal in an image memory into which a picture signal for at least one frame period can be written, while rewriting it, and calculating the average brightness from said picture signal written in said image memory at said plurality of timings within one frame period, and controlling the brightness of the picture signal supplied to said display means such that the brightness reduces as said calculated average brightness becomes higher than a predetermined parameter value.

* * * * *